United States Patent Office 3,352,841
Patented Nov. 14, 1967

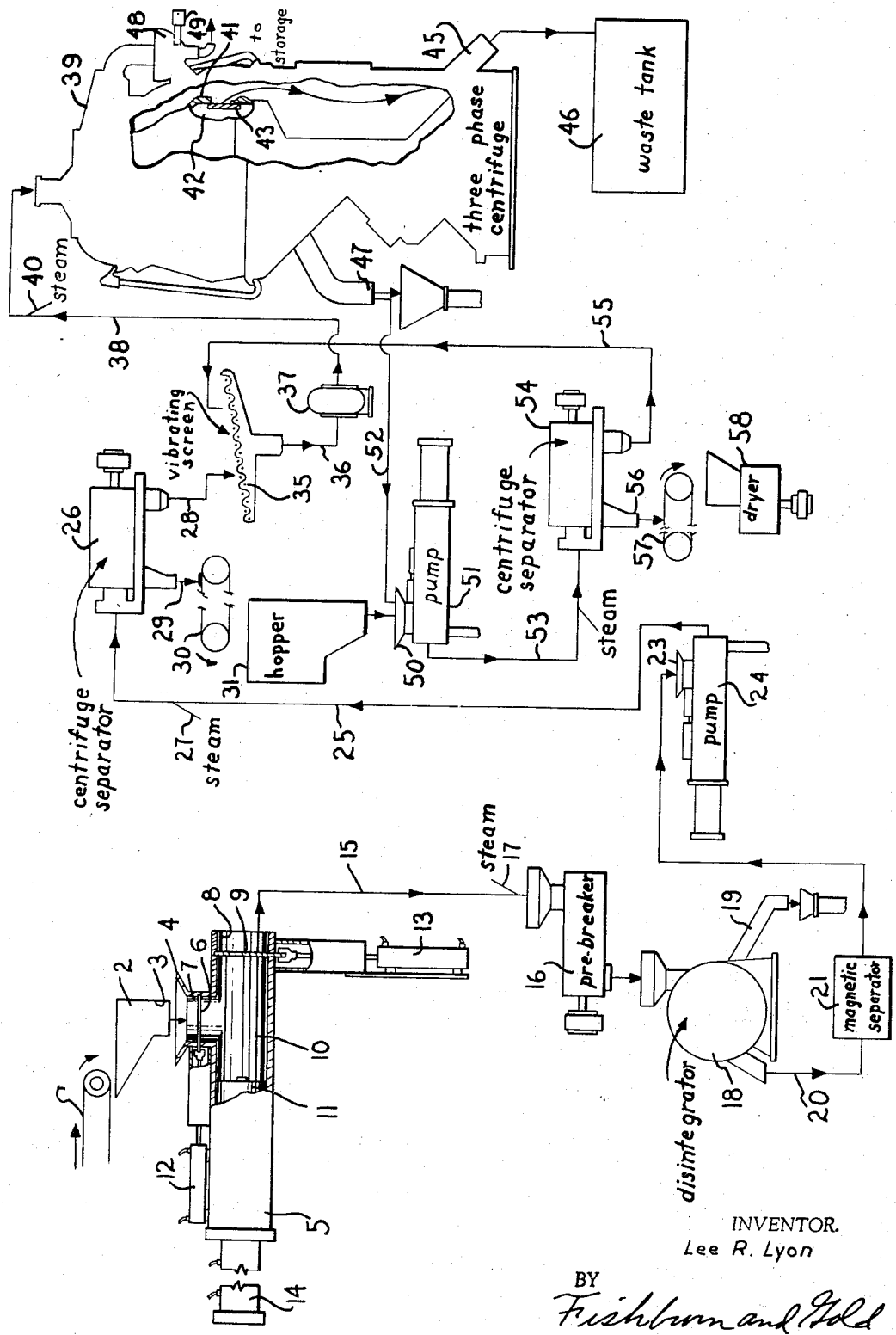

3,352,841
PROCESS FOR SEPARATING AND RECOVERING FATS AND SOLIDS
Lee R. Lyon, Kansas City, Mo., assignor to Lycoil, Inc., Kansas City, Mo., a corporation of Missouri
Filed Mar. 22, 1965, Ser. No. 441,683
3 Claims. (Cl. 260—112)

ABSTRACT OF THE DISCLOSURE

The process of treating of animal and poultry material containing fats to separate and recover the fats and solids. The material is moved from a place of slaughter and the solids reduced in size but not pulverized, then, by centrifugal separation, the material is separated into a liquid phase and a solid phase with water then being added to the solid phase and the mixture centrifugally separated to remove a portion of the fat remaining in the mixture and to provide a solid that is dried to form a low fat content cake. The liquid phase from the first centrifugation is also centrifuged to separate water, oil and sludge, with the water being used to mix with the solid phase from the first centrifugation. Heat is applied by introducing steam into flowing streams of the material to raise the temperature and reduce the viscosity of the oils just prior to centrifugation.

---

In processing of poultry or animal material to separate and recover fat and solids therefrom, it is important that as small an amount of fat remain in the dry solids as is economical for the reason that often the fat is of higher value than the dry solids and that the dry solids are usually solid on the basis of their protein contents so that while the fat may add weight it does not add value to such solids.

The present invention contemplates the processing of poultry or animal materials which may be of such nature as to provide edible products, and also contemplates the processing of hide fleshings or poultry or animal offal. The offal would include substantially all of the inedible materials from the slaughter of poultry or animals with the exception of the feathers from the poultry and the hides from the animals. The invention further contemplates what may be termed low temperature rendering of raw or uncooked poultry or animal materials and the like from packing plants; also, that such material may arrive for processing in various ways, for example on a conveyor belt in a relatively dry state, or just as it comes from the poultry or animal, or it may be supplied in a sluice of water where the water is used to remove the offal. In such cases, the relatively dry material and the material having low water content will be processed as is but if the quantity of water is great the material will be subjected to a screening or other treatment to reduce the quantity of water from the material to be processed for economy in processing.

Poultry and animal materials contain fats or oils and also proteins, both of which have value when separated and recovered. While various poultry and animal material including offal has heretofore been subjected to processes for recovery of usable products therefrom, such processes using high temperature rendering methods had a detrimental effect upon the recovered fats and were inefficient or uneconomical due to slow recovery rates and failure to extract sufficient of the fats to provide desired low fat content of recovered protein material. In the processes using low temperature methods, it has been customary to grind or disintegrate the product mechanically in an effort to rupture the cells and/or provide some heat for aiding in rupturing of fat cells in an effort to release the fat therefrom. Then the material was centrifuged in order to separate and recover the fat that had been mechanically released from said poultry or animal material. Such processes have been inefficient and uneconomical due to insufficient release of the fats and thereby failure to provide desired low fat content of recovered protein materials.

The principal objects of the present invention are to provide for the processing of poultry or animal material to separate and recover fat and solids therefrom with the solids having a very low fat content; to provide such a process wherein the poultry or animal material is in a fresh state and is reduced to relatively large pieces of particles such as will pass through a one-inch screen and is then subjected to a moderate heat to reduce the viscosity of the fat but insufficient heat and for an insufficient time for cooking or rendering of the material whereby the fat is displaced from the material pieces without mechanical rupture of the cells; to provide such a process wherein the large particle heated material is centrifuged to separate liquids and solids thereby obtaining a wet cake and thereafter adding liquid to the wet cake and centrifuging same to wash out, displace and separate other remaining fat from the solids in said cake; to provide a process wherein the wet cake and liquids from the centrifuge are each recycled through centrifuge separations to reduce the fat content of the recovered cake and increase recovery of the fat; to provide such a process wherein the recycling may be repeated as deemed; to provide such a process wherein the liquids used for mixing with the wet cake is the water phase of liquid obtained by centrifuging the fat containing liquid separated from the wet cake; to provide such a process wherein the solids are subjected to a plurality of wetting and separations and then dried to a low fat content solid and the liquid phases are recycled for maximum recovery of fats in a manner that is efficient and economical in the recovery of the usable materials.

Other objects and advantages of this invention will become apparent from the following description taken in connection with the accompanying drawings wherein are set forth by way of illustration and example certain embodiments of this invention.

FIG. 1 is a schematic flow diagram showing the various treating steps to which the material is subjected in recovering and separating fats and solid materials therefrom.

Referring more in detail to the drawings:

The reference numeral 1 indicates suitable apparatus for movement of animal or poultry material from a place of slaughter (not shown) to a processing system. The animal or poultry material may be edible materials of protein and fat or may be inedible materials from the slaughter of poultry or animals which would include substantially all of the inedible material resulting from the slaughter with the exception of feathers of poultry and hides of animals. In instances where the material is in a relatively dry state, the apparatus 1 may be a conveyor or duct and in the illustrated system, is in the form of a conveyor belt moving the animal or poultry material to a hopper or funnel means 2 having a discharge duct 3 leading to an inlet connection 4 of a pump 5 provided with a sliding inlet valve 6.

If the animal or poultry material is moved from the slaughtering point or other source by water, the apparatus 1 or conveyor may be a duct having a sluice of water and, if the water is not too great a quantity, it would be delivered to the hopper 2 for movement to the pump 6 substantially in the same manner as the relatively dry state material. If the quantity of water is too great for economical processing, the liquid and solid material would be subjected to a preliminary separation for screening and gravity removal of a portion of the liquid whereby the liquid remaining with the solids would be of such relative quantity as to permit economical processing.

The pump 5 is of a design to prohibit the fouling thereof with viscous, stringy or large particle material and is preferably of the reciprocating cylinder type with large inlet and outlet ports 7 and 8 respectively controlled by the inlet valve 6 and outlet valve 9 so as to present substantially unobstructed openings for movement of solids, semi-solids, stringy and viscous portions of the material to be processed to and from the pump cylinder 10. The valves 6 and 9 may each be operated in timed relation with the reciprocation of the piston 11 in the cylinder 10 by means of suitable power such as pneumatic cylinders 12 and 13 respectively. The piston 11 is reciprocated by suitable power such as a pneumatic cylinder 14. The pump 5 receives the material to be processed from the duct 3 and pumps same through a flow line 15 to a pre-breaker 16.

The flow of raw uncomminuted material, in the case of poultry offal, includes substantially all inedible materials from the slaughter of the poultry except for the feathers, in other words, the material may include heads, feet, innards, including intestinal tracts, gizzards, etc., and even whole birds which may have been rejected for one reason or another as not being suitable for an edible product. In the case of animal offal, the material may include substantially all of the parts of the animal except the hide. This flow of raw uncomminuted offal is subjected to heat to increase the temperature thereof to about 150 degrees to 160 degrees F. as it enters the pre-breaker 16. The heating is provided by sparging steam into the flow line 15 by means of a temperature-responsive steam sparging connection 17. This allows the steam to enter the material and become mixed therewith in the pre-breaker 16.

The pre-breaker 16 may be such as a Reitz Model 10–H2236 (Santa Rosa, Calif.) arranged whereby material is broken or reduced in size to be handled by subsequent apparatus in the system. From the pre-breaker 16, the material or offal being processed is preferably moved or introduced into a disintegrator 18 preferably of the type manufactured by Reitz Model RD–112–H32 and adapted to remove substantially ungrindable solid particles by screen separation and reduce the remainder to a particle or part size not exceeding one-inch or that will pass through a one-inch screen.

The ungrindable material is discharged as at 19 and discarded. It is to be understood that the pre-breaker 16 and disintegrator 18 may be separate pieces of machinery or they may be a combination machine that will both break the bones and large particles and also reduce the remainder to a particle size that will pass through the screen of the machine.

While a size screen of less than one-inch could be used to thereby produce a smaller particle size, it requires more power, causes more wear in the machine and is not necessary because this disintegration or reduction of the particle size to pass through a one-inch screen is to provide a particle size that can be handled by subsequent apparatus in the system and is not a grinding for mechanical rupture of cell walls for release of fat that might be contained therein.

Of particular importance, I have found that grinding to small particle size may result in an encapsulation of the finer particles with fat. The surface tension of the fat on the small size particles may be greater than the centrifugal force available to break away the fat whereby those small particles carry the fat with them into the solid or cake of the centrifugal separation and the large particles carry very little fat with them. This is also due to the small particles having substantially more surface area in proportion to their weight than the large particles.

The reduced size material contains the protein and fat and is discharged from the disintegrator 18 through a flow line 20 which preferably has a magnetic separator 21 therein for removal of metal particles from said material passing therethrough. While the material in flow line 15 was heated by steam, the large unground chunks heat quickly on the outside with some fat and water thereon becoming quite hot, and the inside of the chunks remain cold. In the grinding the hot and cold material mix together to yield a median temperature. The reduced material in the flow line 20 and separator 21 after passage through the pre-breaker and disintegrator 18 preferably should have a temperature of not less than 150 degrees F., it being desirable to keep the animal or poultry material at as low a temperatuer as possible for as much of the process as is possible. The flow line 20 is connected to an inlet 23 of a pump 24 which may be generally of the reciprocating type having large inlet and outlet ports with sliding valves such as pump 5. However, due to the smaller size of the material handled by the pump 24, it may be smaller in size than the pump 5 and provide substantially continuous flow. The reduced material is preferably continuously pumped by means of the pump 24 through a flow line 25 to a scroll type centrifugal separator 26. It is desirable that the pump 24 be of the reciprocating large port sliding valve type for the reason that the product may contain bone pieces or other material which presents problems in pumping that could jam or stop a conventional pump. The material from the discharge of the pump 24 flowing through the line 25 is subjected to heat to raise the temperature of the material in the flow line 25 to approximately 180 to 190 degrees F. just prior to entering the scroll type centrifuge 26. The reheating of the material in the illustrated system is by sparging steam into the flow line 25 between the pump 24 and the centrifuge 26. The steam is supplied to the flow line 25 by a temperature-responsive steam sparging connection or live steam injection unit 27.

The centrifuge or centrifugal separator 26 is preferably of the type manufactured by Byrd Model No. 18×28 (Walpole, Mass.) and is adapted to separate flowable liquids from heavier solids or semi-solids of the type which may pass through the disintegrator 18. The centrifuge is operated at a high speed, as for example 2000 to 3000 r.p.m. to provide a displacement of the lighter fat in the cells by the heavier water and removal of the fat which is floated off without mechanical rupture of cell walls. The liquid stream from the centrifuge 26 is continuously released therefrom for flow through a duct 28 as later described. The solids from the centrifuge may contain fibrous material, protein and the like and the oil normally associated therewith is largely displaced by the centrifuge 26 with the greater density water in the solids whereupon the oil is displaced into and remains with the flowable liquid portion discharged in the flow line 28. The heavier solids or semi-solids are discharged in the form of a wet cake at 29 to a conveyor 30 for delivery to a suitable receiver 31 for further processing as later described.

The flowable or liquid phase of the processed material is discharged through the flow line or duct 28 to a vibrating screen or the like 35 of approximately 20-mesh to remove remaining solid or semi-solid particles of a size which may clog or damage equipment later used in the process. The flowable liquids and very fine solids and semi-solids remaining in the liquid are directed from the vibrating screen 35 through a flow line 36 to a pump 37. The material is then pumped by the pump 37 through a flow line 38 to a three-phase centrifuge 39. The material in the flow from the screen 35 to the three-phase centrifuge 39 is preferably reheated to raise the temperature to approximately 180 degrees F. to 200 degrees F. In the system illustrated, the reheating is by sparging steam into the flow line 38 between the pump 37 and the centrifuge 39 by a temperature-responsive steam sparging connection 40.

The three-phase centrifuge 39 is of the type known as Titan CNS-70 (Pfaudler Permutit, Rochester, N.Y.) wherein the outer face 41 of the bowl 42 therein periodically opens by withdrawing a gate 43 to discharge all bowl contents. The centrifuge 39 is required because even after the various steps of the process above-described, heavy solid fines and interfacial solid fines still make up a significant part of the offal or material remainder. The heavy solid fines may tend to clog up a nozzle type centrifuge. More troublesome, however, are the interfacial solid fines which tend to collect between the oil and water phase in the bowl and eventually stop oil production. To prevent this, the entire bowl contents are periodically discharged at 45 into a waste receiver or tank 46. Water in the offal is separated and discharged at 47 and the valuable oil is collected at 48. A purity control probe 49 is connected to the oil collection point 48 and is arranged whereby if the oil being recovered is rancid or not of desired quality, the probe causes the centrifuge to dump its contents.

The relatively large particles which may be of a size of approximately one inch or more that is moved to the centrifuge 26 have fat contained in cells and through the high speed rotation of the centrifuge, as for example 2000 to 3000 r.p.m., there apparently is a water displacement as by osmosis and centrifugal action which effects removal of the fat from the cells. The wet cake delivered as at 29 from the centrifuge separator 26 contains in the nature of 50 percent water and up to 5 to 10 percent fat wet basis. The dry solids recovered from the process are customarily sold on the basis of their protein content. Therefore, while the fat retained in the cake from the centrifuge 26 may add weight, it may not add any value from a sales point and, if recovered, to add to the total fat or oil recovered at 48, it provides additional recoverable value from the material.

It is found that by adding water to the wet cake to make the material again pumpable and flowable and then by again centrifuging such material in the nature of one-third to one-half the fat in the wet cake can be removed. This very thing may be repeated as many times as desired with each recycling reducing the fat in the cake by from 35 percent to 50 percent. The water separated and discharged at 47 from the three-phase centrifuge 39 retains some of the heat that was applied to the feed to said centrifuge. Water from both discharges 45 and 47 of the centrifuge 39 may be used in recycling and wetting of the cake. It is found to be particularly desirable to use a portion of the water discharged at 47 for rewetting or adding to the wet cake. The wet cake from the conveyor 30 is discharged into a receiver or hopper 31 and under a controlled flow moves from said hopper and is suitably fed to a centrifugal separation. This material may be collected and then the supply of new material from the disintegration stopped whereby said collected material recycled through the separation 26. The feed from the hopper 31 may be by gravity or other suitable means and in the illustrated process it moves to an inlet 50 of a pump 51. A portion of the water from the discharge 47 of the centrifuge 39 flows through a line 52 to a point of mixture with the wet cake being delivered to the inlet 50 of the pump 51 in order to provide a suitable mixture of the water with the wet cake so that it will be flowable. It is preferred that the pump 51 be of the reciprocating large port sliding valve type due to the size of particles being handled thereby. The water and cake mixed therewith is discharged from the pump 51 through a line 53 and forced therethrough to a scroll type of centrifugal separator 54 which is preferably of the same type as the separator 26. The material flowing in the line 53 even though all previously heated would have cooled through the processing and, therefore, is subjected to heat to raise the temperature in the flow line 53 to approximately 180 to 190 degrees F. just prior to entering the scroll type centrifuge 54. This heating is to again reduce the viscosity of the fat and thereby facilitate its being displaced from cells in the particles.

The centrifuge 54 is operated at high speed to separate liquids from solids and the fats with the water is discharged from the separator 54 through a flow line 55 which delivers same to the vibrating screen 35 so that said liquid and fats will again be recycled through the centrifuge 39 whereby the fats will add to the recovery of the oil or fat that is collected at 48 from the centrifuge 39. The cake or solids resulting in the separation by the separator 54 is discharged as at 56 to a conveyor 57 and, if such cake still retains sufficient fat to be economically recoverable, it may be reprocessed by again mixing with water and subjecting to centrifugal separation which may be by recycling through the separation 54 or an additional separator of that type. The resulting cake from such separation is delivered as by the conveyor 57 to a suitable dryer 58 preferably a direct-fired rotary type drum dryer for drying the solids or cake to a salable condition. By such processing, the percentage of fat in the solids is reduced to a minimum, for example, 5 percent on a dry basis. This reduction is obtained without subjecting the material to any high temperatures for any prolonged period of time and also without any mechanical fine grinding to provide a very small particle size and rupture of cells walls. Furthermore, in the recycling of the wet cake from the separator 26 and use of water from the separator 39 results in efficiencies such as requirement for small amount of additional heating whereby the additional fat recovery and reduction of fat content in the protein dry cake obtained is economically desirable.

It is to be understood that while certain forms of this invention have been illustrated and described, it is not to be limited to the specific forms herein described and shown except insofar as such limitations are included in the claims.

What I claim and desire to secure by Letters Patent is:

1. The process of treating material from slaughter of poultry and animals for recovery of oils and protein solids therefrom consisting of the steps: moving material resulting from the slaughter of poultry and animals from a place of slaughter, reducing the size of the solids in said material to a particle size not exceeding approximately one inch, moving the material having reduced solids in a stream, subjecting said stream of material to heat by introducing steam into said stream to raise the temperature of said material to approximately 180° F. to 190° F. to reduce the viscosity of the oils therein, centrifugally separating said material having reduced solids into a flowable liquid phase and a solid phase with a large portion of the fats normally associated with the solids being displaced therefrom and forming part of the liquid phase, said solid phase being a wet cake, adding water to said wet cake making a mixture that is pumpable, moving said mixture in a stream, centrifugally separating said mixture into a liquid phase and a solid phase wherein a substantial portion of the fat remaining in the mixture is displaced into the liquid phase, and removing water from the solid phase from said second named centrifugal separation to form a low fat content cake.

2. The process as set forth in claim 1 including, flowing the liquid phase of the material from the first named centrifugal separation in a stream, subjecting said stream of the liquid phase to heat by introducing steam therein to reheat said liquid phase to a temperature of approximately 180° F. to 190° F., centrifugally separating said reheated liquid phase into oil, water and sludge, collecting said oil, using the water from the third named centrifugal separation for mixture with the wet cake from the first named centrifugal separation.

3. The process as set forth in claim 2 including subjecting the mixture of wet cake from the first named centrifugal separation and water to heat by introducing steam into the stream thereof to raise the temperature of said mixture to approximately 180° F. to 190° F., said introduction of the steam into said mixture being such as to effect said temperature as the mixture enters said second named centrifugal separation.

References Cited
UNITED STATES PATENTS

| | | | |
|---|---|---|---|
| 2,823,214 | 2/1958 | Sharples | 260—412.6 |
| 2,875,222 | 2/1959 | Dormitzer | 260—412.6 |
| 3,141,774 | 7/1964 | Little | 99—18 |
| 3,282,972 | 11/1966 | Merlis | 260—412.6 |

WILLIAM H. SHORT, *Primary Examiner.*

H. SCHAIN, *Assistant Examiner.*